United States Patent [19]
Belcher

[11] Patent Number: 5,206,973
[45] Date of Patent: May 4, 1993

[54] SOUND-DEADENER FOR WINDOW TORSION BALANCE

[75] Inventor: Edward L. Belcher, Rochester, N.Y.

[73] Assignee: Caldwell Manufacturing Company, Rochester, N.Y.

[21] Appl. No.: 851,421

[22] Filed: Mar. 16, 1992

[51] Int. Cl.$^5$ .................. E05D 13/00; E05F 1/00
[52] U.S. Cl. .................... 16/197; 16/DIG. 6; 49/445
[58] Field of Search ............ 16/197, DIG. 6; 267/74, 267/175; 49/445

[56] References Cited

U.S. PATENT DOCUMENTS

| | | |
|---|---|---|
| 2,580,705 | 1/1952 | Tappan . |
| 2,637,875 | 5/1953 | Hess . |
| 2,774,100 | 12/1956 | Larson et al. .................. 16/197 |
| 2,776,447 | 1/1957 | Addicks .................. 16/197 |
| 2,851,721 | 9/1958 | Decker et al. . |
| 2,877,514 | 3/1959 | Mears, Jr. . |
| 2,929,095 | 3/1960 | Nobes .................. 16/197 |
| 3,091,003 | 5/1963 | Nobes .................. 49/445 |
| 3,478,384 | 11/1969 | Skolnik . |
| 4,423,536 | 1/1984 | Cross .................. 49/445 |
| 4,540,070 | 9/1985 | Yonovich et al. . |
| 4,854,558 | 8/1989 | Newton . |

Primary Examiner—Lowell A. Larson
Assistant Examiner—Carmine Cuda
Attorney, Agent, or Firm—Eugene Stephens & Associates

[57] ABSTRACT

This invention, which provides a solution to the long-standing problem of motion-related rattle in torsion balances for windows, is based upon the discovery that the major source of the rattle is related to the movement of the free end of the twisted rod that is mounted within the coil of the torsion spring. A sound-deadening element of resin material is secured to the free end of the twisted rod, being positioned proximate to the extremity of the free end, and the preferred element has a maximum dimension (measured radial to the spring) that is greater than the maximum cross-sectional dimension of the twisted rod but less than the effective internal diameter of the coiled spring. The sound-deadening element eliminates the rattle by preventing contact between the free end of the rod and the spring, and it also acts as a glide to facilitate relative movement between the rod and the spring during operation of the balance.

14 Claims, 1 Drawing Sheet

SOUND-DEADENER FOR WINDOW TORSION BALANCE

TECHNICAL FIELD

This invention relates to window counterbalance apparatus of the well-known torsion balance type.

BACKGROUND

Window torsion balance units have been well known for a long time (see U.S. Pat. No. 2,580,705 issued in 1952). Such units ordinarily include a cylindrically-coiled torsion spring, enclosed within a cover or tube, and a twisted rod positioned within the coils of the spring. These units often rattle when the window is being raised or lowered; and such rattling can also occur in response to vibration created by passing trucks, slamming doors, high winds, etc.

Such rattling of torsion balance units is annoying, and it has been long recognized as a problem. Decades ago, felt washers were mounted on the springs as sound-deadeners (U.S. Pat. No. 2,877,514 issued in 1959). More recently, molded resin vibration dampeners have been mounted on the springs to space the springs from their covers (U.S. Pat. No. 4,540,070). Also, counterbalance springs have been flocked with fibers, and they have been covered with sound-deadening hot-melt thermoplastic polymer adhesives, as suggested in U.S. Pat. No. 4,854,558.

Another well-known method for reducing such annoying rattling has been to fill the balance cover with grease. However, this latter method has been less than satisfactory, since it has added significantly to the cost of manufacture: The grease must be appropriately sealed during the relative movement between the twisted rod and the encased spring; and it is difficult to find greases that are thick enough to prevent their leaking when ambient temperatures reach 74° C. (100° F.) and still remain sufficiently fluid so that they do not interfere with operation of the units when ambient temperatures drop far below freezing.

The invention disclosed herein is based upon a discovery that makes it possible to deaden the annoying rattling of torsion balance units with remarkably simple apparatus that can be manufactured in a relatively easy and economical manner.

SUMMARY OF THE INVENTION

My discovery indicates that the prior art solutions to the torsion-balance rattle problem have placed undue emphasis on applying sound-deadening means to the coiled spring. Namely, I have discovered that the major source of the rattle is related to the movement of the free end of the twisted rod that is positioned within the coil of the torsion spring.

Therefore, the apparatus of my invention comprises a sound-deadening element secured to the twisted rod at a position proximate to the extremity of its free end. The free end of the twisted rod has a cross-sectional shape wherein the width dimension is greater than the height dimension and wherein the surfaces of the rod are flattened along the width dimension. Preferably, the sound-deadening element is sized so that its effective diameter is (a) greater than the maximum cross-sectional dimension of the rod's free end but (b) less than the internal diameter of the spring through which the free end of the twisted rod relatively moves. When sized in this manner, the sound-deadening element prevents all contact between the free end of the rod and the spring and, at the same time, does not interfere with the movement of the twisted rod relative to the spring.

However, while it is preferred to size the sound-deadening element as just indicated above, I have found that even when the element is not large enough to prevent all possible contact between the rod's free end and the spring, it can still provide substantial reduction of the rattling noises which are created in prior art torsion balances. Therefore, in those instances where such less-than-total sound deadening is considered sufficient, such substantial improvements over the prior art can still be achieved by my invention if the element is sized so that its dimension in a direction normal to the width-dimension surfaces of the rod is as small as three-quarters of the cross-sectional width of the rod. Such reduction in the size of the sound-deadening element may also simplify manufacturing processes and reduce costs.

In the preferred embodiment of the invention, the sound-deadening element is comprised of a non-metallic material, preferably a resin, that is formed through and around a hole positioned near the extremity of the twisted rod's free end. A dowel pin of the sound-deadening material, e.g., polypropylene or polyethylene, is inserted through the hole and then shaped by heated dies to form a ball-like element having the desired dimensions.

In this preferred form, the ball-like hemispheres of resin not only prevent any contact between the free end of the twisted rod and the spring, but they also act as a glide that actually facilitates the relative movement of the free end of the twisted rod within the coiled spring; and contact between the sound-deadening material and the interior of the spring does not create an annoying rattle. The result is an improvement of remarkable simplicity and economy that solves the rattle problem and, at the same time, enhances operation of the torsion balance.

DRAWINGS

Figure 2:
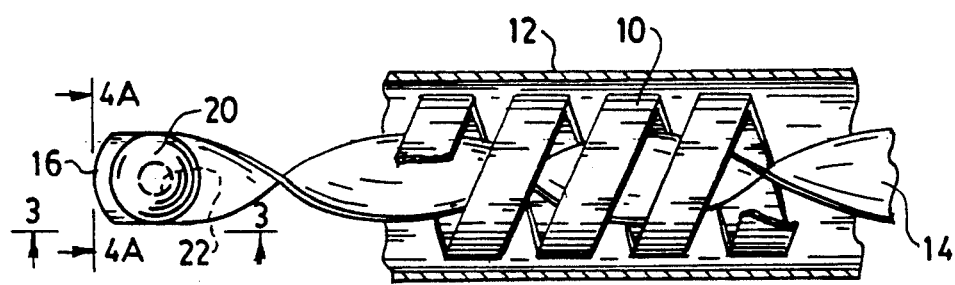
FIG. 2 is a fragmentary view of the invention as applied to a torsion balance of the type shown in FIG. 1.
Figure 4A:
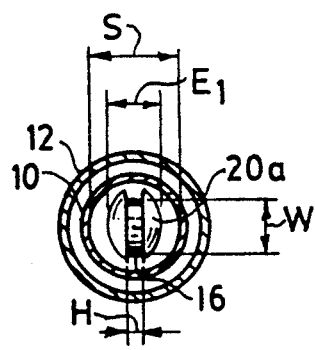
Figure 4B:
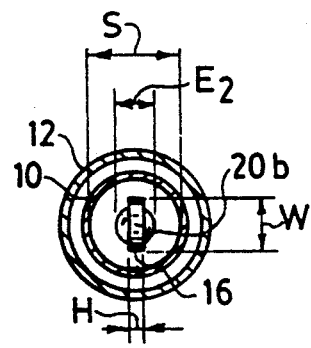
Figure 4C:
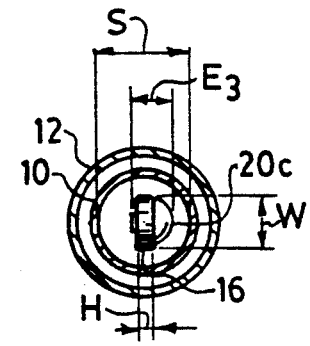

FIG. 4A is a schematic cross-sectional view of the torsion balance of FIG. 2 taken in the direction of the arrow 4 and identifying the measurements critical to dimensioning the preferred form of the invention; and FIGS. 4B and 4C are views, similar to FIG. 4A, of two further embodiments of the invention in which the sound-deadening element is sized smaller than in the preferred embodiment of FIG. 4A.

Figure 3:
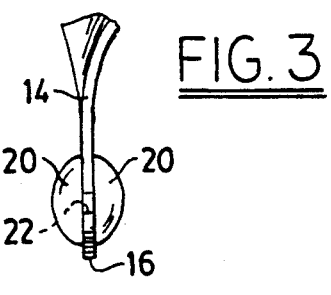
FIG. 3 is a partial side view of the free end of the twisted rod portion of the torsion balance of FIG. 2 taken in the direction of the arrow 3.
Figure 5:
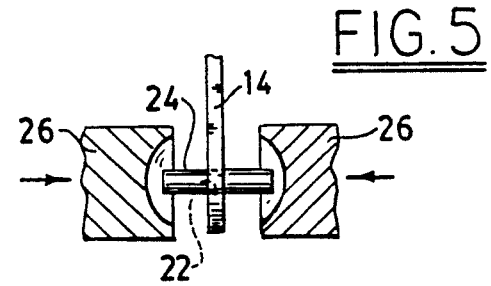

FIG. 5 is a view similar to that shown in FIG. 3, showing schematically the preferred way of forming the sound-deadening glide element around the free end of the twisted rod.

DETAILED DESCRIPTION

Figure 1:
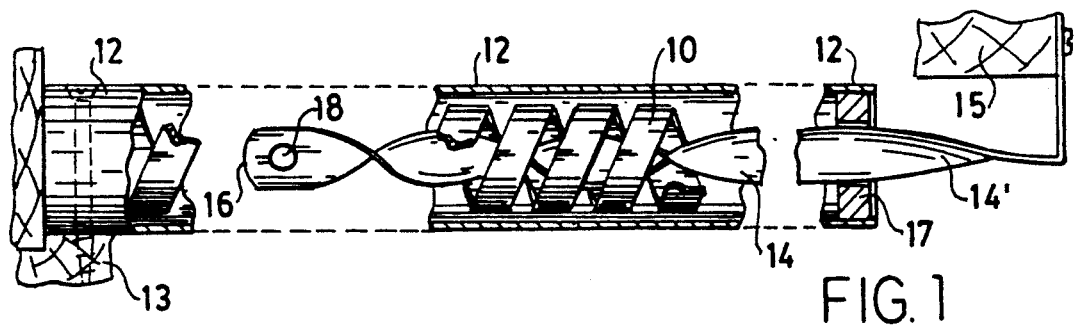
FIG. 1 is a fragmentary schematic view of a prior art torsion balance of the type being improved by the invention.

The fragmentary view of FIG. 1 shows the key elements of a well-known type of prior art torsion balance: Namely, a torsion spring 10 is cylindrically coiled within a balance cover 12 that is attachable to one element of a movable window (e.g., frame 13), while a twisted rod 14 has a fixed end 14' adapted for attachment to the other element of the movable window (e.g., sash 15). The free end of twisted rod 14 is positioned within coil 10; is movable relative to coil 10; and, in most prior art designs, is mounted and retained within balance cover 12 by means of a bushing or follower 17.

Positioned near the extremity 16 of the free end of twisted rod 14, is a protrusion 18 which is used to prevent accidental removal of twisted rod 14 from balance cover 12. Protrusion 18 is often a dimple pressed in the rod, or it is a small metal dowel secured in a hole through the rod. That is, protrusion 18 prevents the extremity 16 of the free end of rod 14 from inadvertently passing through bushing or follower 17.

As indicated earlier, I have discovered that the rattle which accompanies known torsion balances is caused primarily by the movement of the free end of twisted rod 14 and its contact with the interior of spring 10. Therefore, as shown in FIG. 2, my invention modifies known torsion balance units by adding a sound-deadening element 20 near the extremity 16 of the free end of twisted rod 14.

In the preferred embodiment illustrated in FIGS. 2 and 3, sound-deadening element 20 comprises a resin material, e.g., polyethylene or polypropylene, which is formed in a ball-like manner with hemispheric shapes protruding from each side of rod 14. FIG. 4A shows the measurements for the preferred dimensioning of the sound-deadening element (identified in FIG. 4A by numeral 20a). Namely, the free end of rod 14 has a cross-sectional configuration in which the width dimension W is greater than its height H, and sound-deadening element 20a has a maximum dimension $E_1$ (measured radial to spring 10) that is greater than the maximum cross-sectional dimension W of twisted rod 14 but less than the internal diameter S of coiled spring 10.

When dimensioned as shown in FIG. 4A, sound-deadening element 20a prevents all contact between the free end of twisted rod 14 and the interior of spring 10, thereby eliminating this major source of annoying torsion balance rattle. Further, the smooth surface of sound-deadening element 20a acts as a glide in the event it contacts the interior of spring 10 during any relative movement between rod 14 and spring 10, thereby facilitating such relative movement during operation of the torsion balance unit.

To simplify the forming and positioning of sound-deadening element 20, a hole 22 is made near the extremity 16 of twisted rod 14. As shown in FIG. 5, a small dowel 24 of resin material is positioned in hole 22, and then heated dies 26 are moved together in the direction of the arrows to soften and form resin dowel 24 into the desired ball-like shape discussed above.

In addition to its primary sound-deadening function and its secondary glide function, element 20 has a further function: Element 20 prevents the extremity 16 of the free end of rod 14 from passing through the balance unit's bushing or follower 17, thereby replacing prior art protrusion 18.

As indicated above, I have found that my invention also substantially reduces rattling even in those instances where its sound-deadening element 20 does not prevent all contact between the free end of rod 14 and the interior of spring 10. FIGS. 4B and 4C show the possible dimensioning of smaller sound-deadening elements in two further embodiments of the invention.

In FIG. 4B, the sound-deadening element 20b has a dimension $E_2$ which extends normal to the width dimension W of the free end of rod 10; and element 20b is positioned so that, along this normally-extending dimension $E_2$, it extends equally in each direction beyond the flattened width-dimension surfaces of rod 10 In contrast, in the embodiment shown in FIG. 4C, the sound-deadening element 20c is positioned so that almost all of its normally-extending dimension $E_3$ extends beyond only one of flattened width-dimensioned surfaces of rod 10.

Either of these further embodiments substantially reduces rattling. However, in both, better results are obtained when the normally-extending dimensions $E_2$ and $E_3$ of respective elements 20b and 20c are designed to be at least equal to or greater than three-quarters of dimension W of rod 10.

I claim:

1. A sound-deadened torsion balance for a window, sash movable relative to a cooperating window jamb, said balance having:
   - a balance cover for attachment to one of said jamb and sash;
   - a torsion spring cylindrically coiled within said cover, said spring having a predetermined internal diameter; and
   - a twisted rod having a fixed end adapted for attachment to the other of said jamb and sash and having a free end positioned within said spring, the free end of said rod being constructed with a predetermined maximum cross-sectional dimension to permit movement relative to said spring;

said balance comprising:
   a sound-deadening element secured to said twisted rod at a position proximate to the extremity of the free end thereof, said element being sized so that its maximum dimension measured radial to said spring is greater than said maximum cross-sectional dimension of said free end but less than said internal diameter of said spring to prevent contact between the free end of said rod and said spring without interfering with the movement of said twisted rod relative to said spring.

2. The sound-deadened torsion balance of claim 1 wherein said sound-deadening element comprises a non-metallic material.

3. The sound-deadened torsion balance of claim 2 wherein said sound-deadening element comprises a resin material.

4. The sound-deadened torsion balance of claim 1 wherein said element is formed in a ball-like shape about the free end of the twisted rod.

5. The sound-deadened torsion balance of claim 1 wherein said twisted rod has a hole therethrough in proximity to the extremity of its free end, and wherein a portion of said sound-deadening element is positioned within said hole.

6. The sound-deadened torsion balance of claim 3 wherein said element comprises polypropylene.

7. The sound-deadened torsion balance of claim 3 wherein said element comprises polyethylene.

8. A sound-deadened twisted rod for a window torsion balance, said rod having a fixed end adapted for attachment to a window and a free end for insertion into said balance, and said balance including:
   - a balance cover; and
   - a torsion spring cylindrically coiled within said cover, said spring having a predetermined internal diameter within which said free end of the twisted rod is received;

- said free end of the twisted rod being constructed with a predetermined maximum cross-sectional dimension smaller than said effective internal diameter to permit relative movement between said twisted rod and said spring;

said twisted rod comprising:

- a cross-sectional shape wherein the width dimension is greater than the height dimension and wherein the surfaces of said rod are flattened along said width dimension;
- a sound-deadening element secured at a position proximate to the extremity of the free end of said twisted rod, said element being sized with a dimension which extends in a direction normal to one of said flattened width surfaces; and
- said normally-extending dimension is equal to or greater than three-quarters of said width dimension.

9. The sound-deadened twisted rod of claim 8 wherein said element is formed in a ball-like shape.

10. The sound-deadened twisted rod of claim 8 further comprising a hole therethrough in proximity to the extremity of said free end, and wherein a portion of said sound-deadening element is positioned within said hole.

11. The sound-deadened twisted rod of claim 8 wherein said sound-deadening element comprises a non-metallic material.

12. The sound-deadened twisted rod of claim 8 wherein said sound-deadening element comprises a resin material.

13. The sound-deadened twisted rod of claim 8 wherein said normally-extending dimension of said sound-deadening element extends equally beyond each of said flattened surfaces of said rod.

14. The sound-deadened twisted rod of claim 8 wherein more than half of said normally-extending dimension of said sound-deadening element extends beyond only one of said flattened surfaces of said rod.

* * * * *